(12) United States Patent
Goris et al.

(10) Patent No.: US 7,372,550 B2
(45) Date of Patent: May 13, 2008

(54) MEASURING DISTANCE USING PERSPECTIVE

(75) Inventors: Andrew C. Goris, Loveland, CO (US); David W. Boyd, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 148 days.

(21) Appl. No.: 11/244,950

(22) Filed: Oct. 5, 2005

(65) Prior Publication Data
US 2007/0076187 A1    Apr. 5, 2007

(51) Int. Cl.
*G01C 3/08* (2006.01)
(52) U.S. Cl. .................................... 356/4.03
(58) Field of Classification Search ............... 356/4.03
See application file for complete search history.

(56) References Cited

U.S. PATENT DOCUMENTS

| 6,400,848 | B1 | 6/2002 | Gallagher | |
|---|---|---|---|---|
| 6,842,189 | B2 * | 1/2005 | Park | 348/148 |

* cited by examiner

*Primary Examiner*—Thomas H. Tarcza
*Assistant Examiner*—Luke D Ratcliffe

(57) ABSTRACT

A method is disclosed for measuring distance from a camera to parts of a scene using a characterization of perspective distortion in a photograph of the scene. In one example embodiment, a first distance measurement is obtained from the camera to a first point in the scene, the perspective distortion is characterized, and the distance to at least one other point on a plane in the scene is computed based on the first distance measurement and the perspective characterization.

27 Claims, 8 Drawing Sheets

MEASURING DISTANCE USING PERSPECTIVE

FIELD OF THE INVENTION

The present invention relates to photography, and more specifically to exploiting perspective information in a scene to measure distance.

BACKGROUND OF THE INVENTION

It is useful for a photographer to know the distances from a camera to various locations in a scene to be photographed. For example, a photographer may wish to choose an aperture setting and focus distance so that certain objects in the scene are sharply focused in the resulting photograph. Or a photographer may wish to choose an amount of supplemental flash illumination such that distant objects receive an effective amount of supplemental light while near objects are not illuminated too brightly.

Distance information is useful for post-processing of a photograph as well.

For example, objects in a photograph taken with flash may be digitally brightened or darkened based on their distance from the camera so that the scene appears evenly illuminated.

An automatic camera may exploit distance information in similar ways, choosing photographic settings automatically based on known distances.

Typically, a camera focuses on only a small region or single subject in a scene. The distance from the camera to the subject of focus can be derived from the positions of elements in the camera lens, but this method gives no information about distances to other objects in the scene. Some cameras provide a "depth of field mode", wherein the photographer can direct the camera to focus on multiple scene locations one at a time, and the camera uses the multiple focus measurements to select settings for taking a photograph. This technique adds to the time required to take a photograph.

Other methods of measuring distances to multiple scene locations may add cost and complexity to a camera.

DETAILED DESCRIPTION

Figure 1:
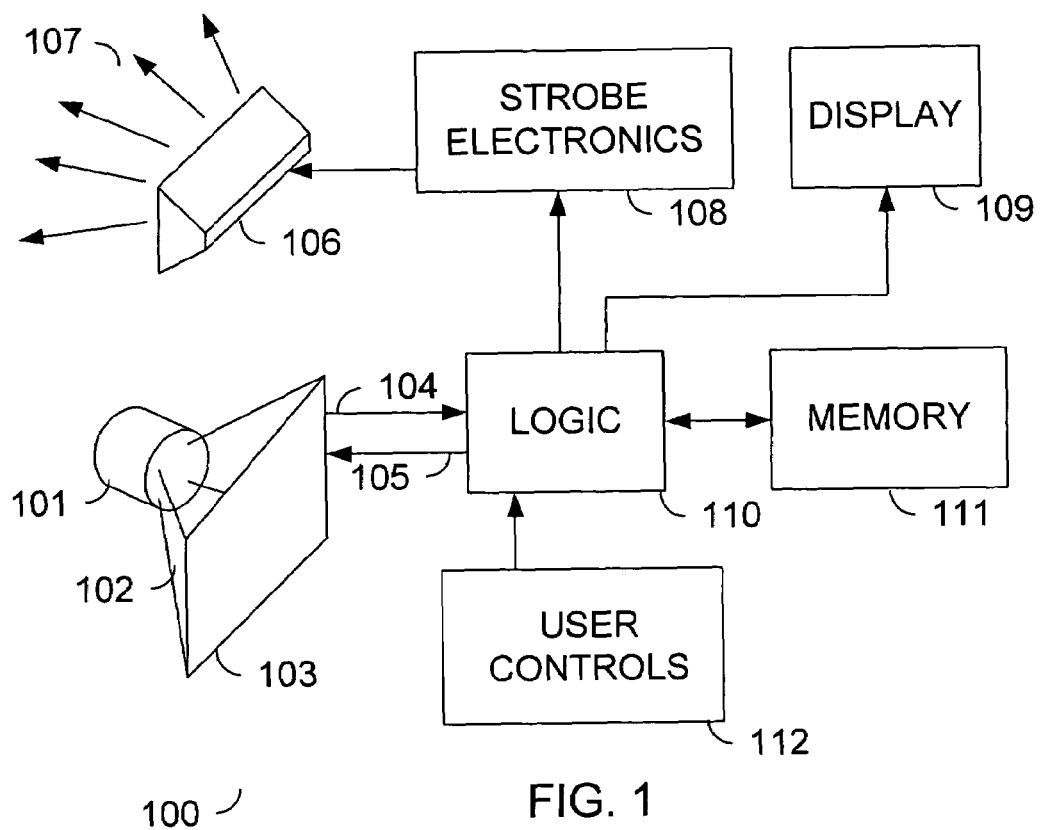
FIG. 1 shows a simplified block diagram of a digital camera.

FIG. 1 shows a simplified block diagram of a digital camera 100, which may implement an example embodiment of the invention. Lens 101 gathers light emanating from a scene, and redirects the light 102 to an electronic array light sensor 103. Sensor 103 comprises an array of light-sensitive elements, often called pixels. Each pixel on array 103 corresponds to a particular scene location by virtue of the operation of lens 101. In many cameras, each sensor pixel comprises a color filter so that color information about the scene is obtained. One of skill in the art will recognize that the invention may be embodied in a camera with color capability or one without. Sensor 103 communicates image data signals 104 to logic 110. Logic 110 may comprise an analog to digital converter, a microprocessor or digital signal processor, other kinds of circuitry, or any of these in combination.

Logic 110 converts image data signals 104 to digital values representing the light intensities measured at the sensor pixel sites. An ordered array of these digital values, each representing the brightness, color, or both of a particular scene location, may be called a digital image or a digital photograph, or simply an image or a photograph. The digital values corresponding to pixel locations on sensor 203 may be called "pixel values", or "pixels".

Logic 110 may also perform other functions, such as generally controlling the operation of camera 100, controlling sensor 103 through control signals 105, 20 interacting with a user of the camera through display 109 and user controls 112, processing digital images, and transmitting digital images to other equipment for processing, display, or printing. Preferably, lens 101 is automatically focused under the control of logic 110.

A flash or strobe unit 106 may provide supplemental light 107 to the scene under the control of strobe electronics 108, which are in turn controlled by logic 110. Memory 111 provides storage for digital images captured by the camera, as well as for camera configuration information, for program instructions for logic 110, and for other items.

In one common method digital camera operation, during composition of a photograph the camera takes a series of preliminary photographs. These preliminary photographs may be displayed on display 109 to aid the camera user in composition of a "final" photograph, may be examined for spatial contrast in order to determine what focus adjustments should be made, may be examined for exposure level so that proper exposure settings can be selected, and may be used for other purposes.

Figure 2:
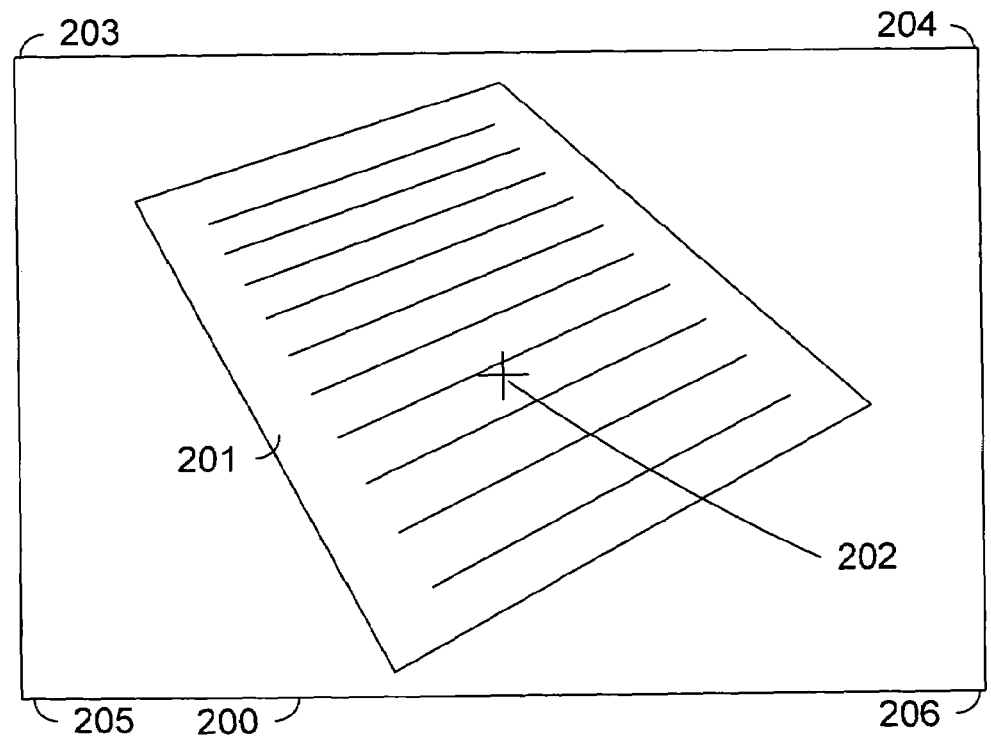
FIG. 2 shows a synthetic representation of a photograph of a page of printed text.

FIG. 2 shows a synthetic representation of a photograph 200 of a page 201 of printed text. The photograph has been taken, using camera 100, from an oblique angle such that rectangular page 201 appears distorted. The schematic lines of text are parallel on page 201, but appear in the image to converge at a distant vanishing point. This distortion may be called perspective or keystone distortion, and occurs because features distant from the camera appear smaller than similar features near the camera. The camera 100 has focused on the part of page 201 at focus point 202 in the center of the photograph. The distance from the camera to page 201 at focus point 202 can be derived, by well-known methods, from the positions of elements of lens 101. Preferably, lens 101 is automatically focused under the control of logic 110, so that logic 110 can read the element positions directly.

Figure 3:
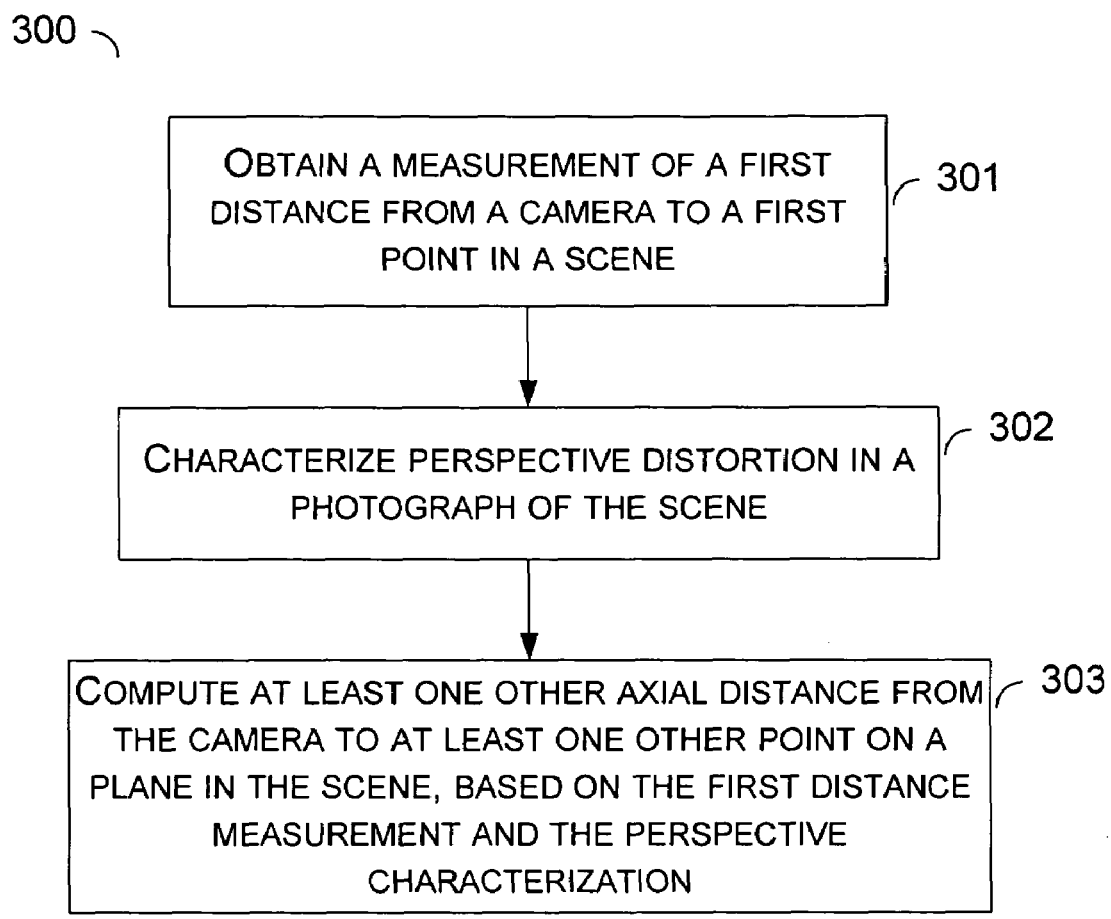
FIG. 3 depicts a flowchart of a method in accordance with an example embodiment of the invention.

FIG. 3 depicts a flowchart 300 of a method in accordance with an example embodiment of the invention for determining axial distances from the camera to other parts of a plane in a scene such as that in photograph 200. An axial distance is a distance along the optical axis of the camera lens to a focal plane that includes the point of interest. A focal plane is a plane perpendicular to the lens optical axis. In step 301, a first distance measurement is obtained to a first point in the scene. Preferably, this first point is the location of the object on which camera 100 has focused, and the distance measurement is derived from the positions of elements of the camera lens 101.

In step 302, perspective distortion in the scene is characterized. Preferably, the distortion is characterized by identifying a dominant set of converging lines in a photograph of the scene. For the purposes of this disclosure, lines may be isolated linear areas of a particular color or brightness level in a photograph, such as the synthetic text lines in FIG. 2, or may be elongated high-contrast transitions or color or brightness in a photograph. For example, in a photograph of a building, a vertical corner of the building may form a line in the photograph.

In step 303, an axial distance is computed to at least one other point in a particular plane in the scene, based on the first distance measurement and the perspective distortion. Preferably, the computation proceeds on the assumption that converging lines identified in the photograph represent features that are actually parallel in the scene, and only appear to converge in the photograph because of the perspective distortion. The particular plane is one that includes the point on which the camera has focused, and on which parallel lines would exhibit the same perspective distortion as is dominant in the photograph. In photograph 200 of FIG. 2, the particular plane is the plane of page 201, which includes focus point 202.

In one example use, photograph 200 may be a preliminary photograph, used by camera 100 to determine exposure settings or for other purposes. Camera 100 may perform, using logic 110, the method of FIG. 3 to compute the axial distance to the extended plane of page 201 in the corners 203-206 of photograph 200. Camera 100 may then choose a combination of an aperture setting and focus distance (the axial distance from the camera at which to focus) such that the plane of page 201 is in acceptable focus in all four corners of photograph 200, thereby ensuring that all of page 201 is in acceptable focus in a final photograph of the scene. Methods for selecting an appropriate combination of aperture and focus distance are known in the art. The camera may simply select the focus distance found by focusing on focus point 202, in which case only an aperture setting need be chosen before taking a final photograph. Or, the camera may re-focus before taking the final photograph so that the aperture size may be optimized for the lighting conditions that are present.

In another example use, photograph 200 may be a final photograph taken using supplemental illumination from flash 106. As such, near portions of page 201 may be more brightly illuminated than distant portions because the illumination provided by flash 106 decreases with distance from the camera. (This effect is not shown in the simplified view of FIG. 2.) The decrease is generally approximately in inverse proportion to the square of the distance from the camera. Camera 100 may perform the method of FIG. 3 to compute the axial distances to points on the extended plane of page 201, and then use the distance information to selectively lighten or darken areas of the photograph so that page 201 appears evenly illuminated. Alternatively, camera 100 may simply record the distance to focus point 202 and associate the distance with the digital image so that the method of FIG. 3 may be performed later, for example by a computer.

Preferred techniques for implementing steps 302 and 303 of the method of FIG. 3 will now be described in detail.

Figure 4:
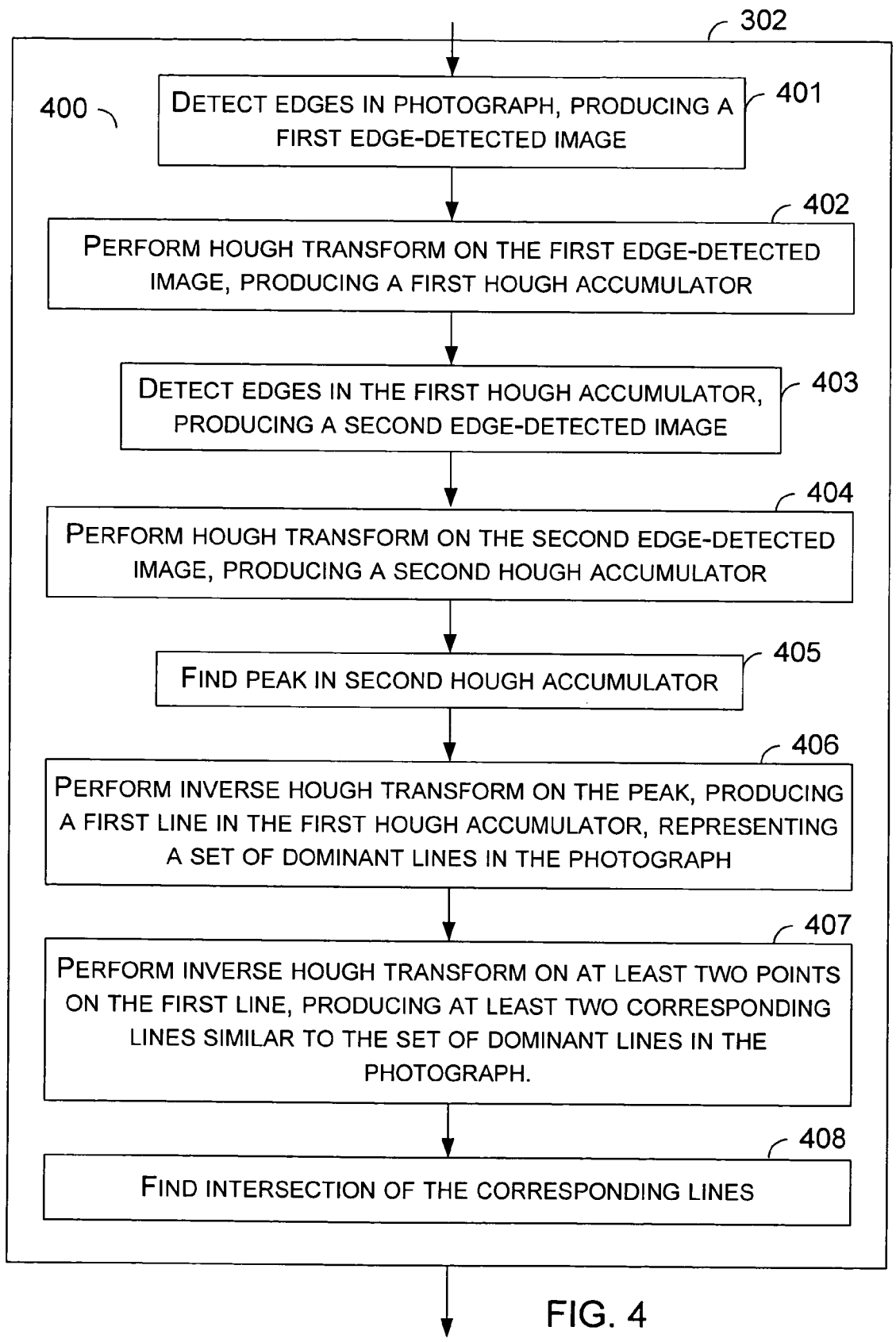
FIG. 4 shows a flowchart of a preferred example method of performing one step of the example method of FIG. 3.
Figure 5A:
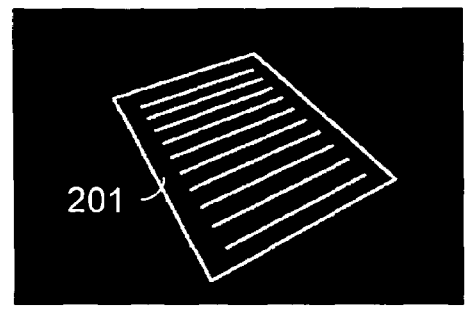
FIGS. 5A-5F show various intermediate results of a method in accordance with an example embodiment of the invention, as applied to the photograph of FIG. 2.

FIG. 4 shows a flowchart of a preferred example method of performing step 302, characterizing the perspective distortion in a photograph. These steps will be illustrated using photograph 200 as an example. In step 401, edges in the photograph are detected, producing a first edge-detected image. This step is preferably performed by applying an edge detection operator, such as the Sobel operator, the Roberts cross operator, or a similar operator to the digital photograph. Such edge detection operators are known in the art, and several are described in Jain, Kasturi, and Schunck, *Machine Vision* (McGraw-Hill, Inc., New York, 1995). FIG. 5A shows the first edge-detected image that results from applying the Sobel operator to photograph 200.

Figure 5B:
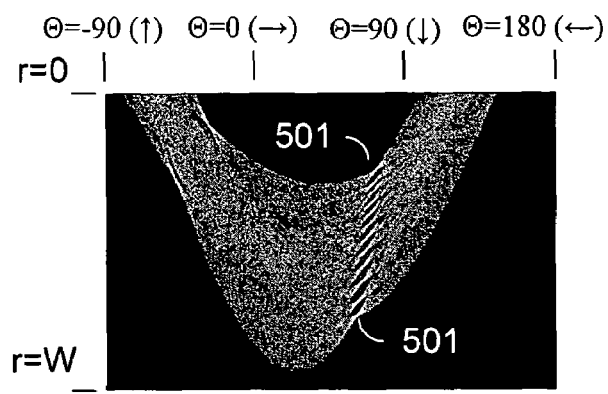

In step 402, a Hough transform is performed on the first edge-detected image. The Hough transform is known in the art, and is also described in Jain, Kasturi, and Schunck, *Machine Vision* (McGraw-Hill, Inc., New York, 1995). Briefly, the Hough transform produces a transformed digital image called a Hough accumulator. Brightness peaks in the Hough accumulator correspond to lines or line segments in the original image. FIG. 5B shows the Hough accumulator that results from applying the Hough transform to the first edge-detected image of FIG. 5A. In this example implementation, the Hough accumulator has the same number of entries as digital photograph 200 has pixel locations. The parameters r and θ of the Hough transform are shown on the vertical and horizontal axes respectively. The range of the parameter θ covers 270 degrees, which is sufficient to characterize any possible line in the image being transformed using only positive values for the parameter r. One of skill in the art will recognize that other arrangements and sizes are possible for the Hough accumulator.

Figure 5C:
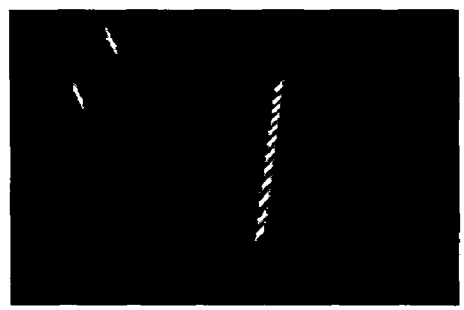
Figure 5D:
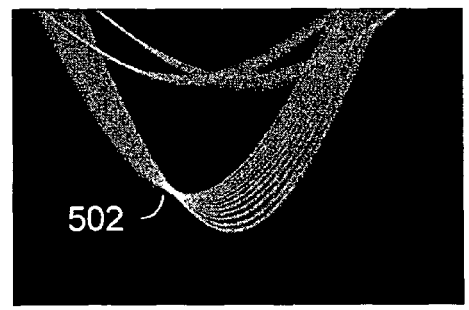

Due to the natural operation of the Hough transform, lines that are parallel or nearly so in the image being transformed (FIG. 5A) map to peaks in the Hough accumulator (FIG. 5B) that are arranged approximately linearly. The linear approximation is generally sufficient for the purposes of this disclosure. In FIGS. 5A and 5B, the schematic lines of text on page 201 and the upper and lower edges of page 201 map to the set of bright peaks 501 in FIG. 5B. In order to characterize the line of Hough accumulator peaks, in steps 403 and 404 a second edge detection and a second Hough transform are applied to the first Hough accumulator. FIG. 5C shows a second edge-detected image that is the result of applying the Sobel operator to the first Hough accumulator of FIG. 5B. FIG. 5D shows a second Hough accumulator that is the result of applying the Hough transform to the second edge-detected image of FIG. 5C. Because there is a set of dominant lines in photograph 200, the second Hough accumulator of FIG. 5D has a single bright peak 502. The location of peak 502 characterizes the location of the line of peaks 501 in the first Hough accumulator of FIG. 5B.

In step 405, the location of peak 502 is determined. In one example embodiment of the invention, peak 502 is located by computing the sum of the elements of each possible 5-element by 5-element subarray of the Hough accumulator of FIG. 5D. The peak is assumed to be at the center of the subarray with the largest element sum. Other methods of finding peak 502 are possible.

Figure 5E:
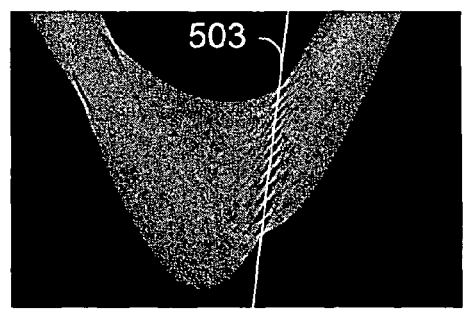

In step 406, an inverse Hough transform is performed, producing line 503 representing a set of dominant lines in original photograph 200. FIG. 5E shows line 503, represented by peak 502, mapped back onto the first Hough accumulator of FIG. 5B. The inverse Hough transform is also known in the art. Because the dominant lines in photograph 200 converge, the line of peaks 501 is tilted from vertical.

Figure 5F:
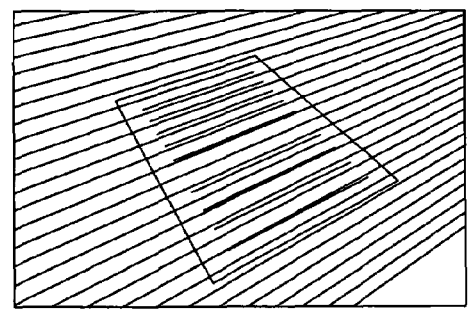

Each point on line 503 represents a possible line that "fits in" with the dominant set of lines in the original photograph 201. In step 407, a second inverse Hough transform is performed on at least two points from line 503, producing corresponding lines that are similar to the set of dominant lines in photograph 200. FIG. 5F shows photograph 200 with superimposed lines that are derived from points on line 503. The set of superimposed lines converge approximately at the same vanishing point as the set of schematic text lines on page 201.

Figure 6:
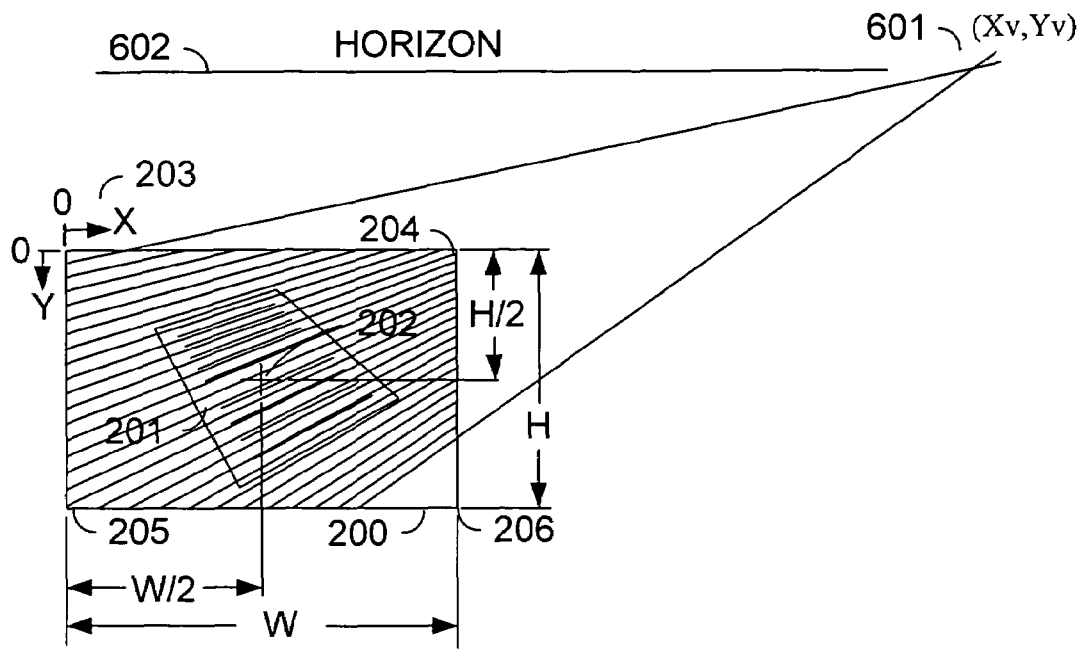
FIG. 6 illustrates the location of the intersection of two lines of FIG. 5F.

In step 407, an intersection of the corresponding lines is found. In one 0example embodiment, two of the corresponding lines, preferably the two lines passing nearest the center of photograph 200, are chosen, and their intersection used to approximate the vanishing point of the dominant lines in the photograph. Methods of computing the intersection of lines are well known in the art. FIG. 6 illustrates the location of the intersection 601 of two of the superimposed lines of FIG. 5F. Intersection 601, with coordinates $(X_v, Y_v)$ serves as an approximation of a vanishing point for photograph 200. Once vanishing point 601 has been located, the perspective distortion in photograph 200 has been characterized.

FIG. 6 also illustrates some parameters useful in performing step 303 of FIG. 3, computing the distance from the camera to at least one other point on a plane in the scene based on the first distance measurement and the perspective characterization. A feature on page 201 near the bottom edge of photograph 200 (Y nearly equal to H) will appear larger than a similarly-sized feature on page 201 near the top edge (Y nearly zero), because given the orientation of the plane of page 201 relative to the camera, features near the bottom edge of photograph 201 are nearer the camera. A feature at the horizon 602 (if the horizon were in the field of view of photograph 200) would be vanishingly small. In fact, the axial distance from the camera to a particular point on the plane of page 201 is in inverse relation to the distance from horizon 602 to the location of the feature in photograph 200. For example, a first feature twice as far from horizon 602 as a second feature is half the axial distance from the camera as the second feature. In the example of FIG. 6, assume that the known distance of focus point 202 to the camera (possibly derived from the positions of elements of lens 101) is one meter. The height H of photograph is 400 pixels, and the width W is 600 pixels. The location of horizon 602, found previously, is approximately $Y_v = -302$ pixels. Focus point 202 is then 302+200=502 pixels from horizon 602. Corner 204 is 302 pixels from horizon 602, or about 0.60 times as far. Therefore, features on the plane of page 201 at corner 204 are 1/0.60 or 1.66 times the axial distance from the camera as is focus point 202. That is, corner 204 is on a focal plane that is 1.66 times as far from the camera as the focal plane that includes focus point 202. Similarly, features on the plane of page 201 at corner 206 are 502/702=0.72 times the axial distance from the camera as is focus point 202. Therefore, the plane of page 201 in photograph 200 extends axially approximately from 0.72 meters from the camera to 1.66 meters from the camera.

As has been previously suggested, camera 100 performing a method in accordance with an example embodiment of the invention may use this distance information to choose a combination of a lens aperture and a focus distance such that all of the plane of page 201 visible in photograph 200 is appears in focus. Similarly, if the distance from the camera to focus point 202 is recorded along with digital photograph 200, and photograph 200 is taken using an on-camera flash, photograph 202 may be post-processed to adjust the brightness of pixels in photograph 200 such that page 201 appears uniformly illuminated. The post-processing could take place in camera 100 using logic 110, or may be performed in another device, such as a computer to which photograph 200 has been transferred.

Figure 7:
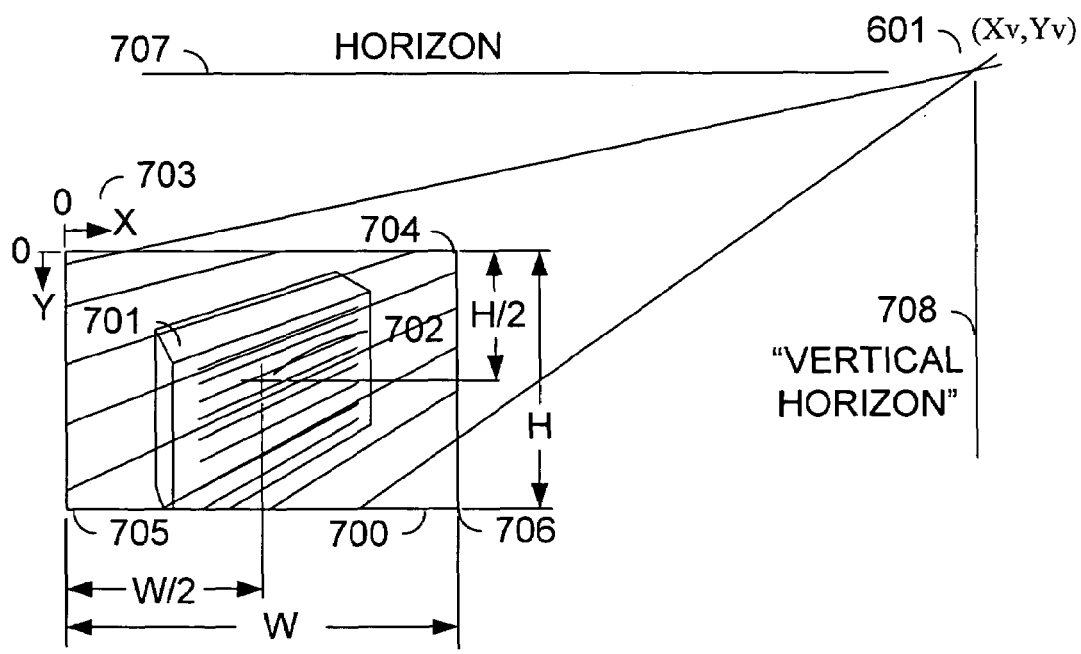
FIG. 7 shows a synthetic representation of a photograph of an object.

There may be some ambiguity in the characterization of the perspective distortion in a photograph. FIG. 7 shows a synthetic representation of a photograph 700 of an object 701 and illustrates a vanishing point of photograph 700. Object 701 comprises a dominant set of parallel lines. The camera used to take photograph 700 has focused at focus point 702. Photograph 700 has corners 703-706. Performing the method of FIG. 3 on photograph 700 results in exactly the same vanishing point 601 as resulted from processing photograph 200. However, in photograph 700, a different plane contains the dominant set of parallel lines. Because the plane containing focus point 702 is a vertical plane (unlike the horizontal plane of page 201 in photograph 200), the distance from the camera to a point on the plane containing focus point 702 is inversely related to the distance of the location of that point in photograph 700 to "vertical horizon" 708.

In the example of photograph 700, assume that the distance from the camera to focus point 702 is one meter. The width W of photograph 700 is 600 pixels. "Vertical horizon" 708 is located at $X_v = 1424$ pixels. Focus point 702 then appears 1424−300=1124 pixels from vertical horizon 708. Corner 703 is 1424 pixels from vertical horizon 708, or about 1.27 times as far. Therefore, features on the plane containing focus point 702 at corner 703 are 1/1.27 or 0.79 times the axial distance from the camera as is focus point 702. Similarly, corner 704 is 824 pixels from vertical horizon 708, or 824/1124=0.73 times as far as focus point 702 appears. Features on the plane containing focus point 702 at corner 704 are then 1/0.73 or 1.36 times the axial distance from the camera as is focus point 702. The extended plane containing focus point 702 and the dominant parallel lines in photograph 700 therefore extends from 0.79 meters from the camera to 1.36 meters.

Recall that using the same vanishing point, the plane of page 201 in photograph 200 was found to extend from 0.72 meters from the camera to 1.66 meters. This ambiguity may be dealt with in any of several ways. In one example implementation, when a camera is using the distance information to select a combination of an aperture and a focus distance that ensures all of a particular plane in the image is in focus, both distance ranges may be computed and the extreme distances used to select a lens aperture. For example, given the vanishing point found for both photograph 200 and photograph 700, the camera would choose an aperture and a focus distance that ensures that objects between 0.72 and 1.66 meters from the camera are in focus, because that range found using horizon 602 also encompasses the range of 0.79 meters to 1.36 meters found using "vertical horizon" 708.

Alternatively, modes may be provided. For example, in a "document" mode, a camera or post-processing software may assume that distances computed using a horizon are correct, and discount distances computed using a "vertical horizon". In an "architecture" mode, a camera or post-processing software may assume that distances computed using a "vertical horizon" are correct. Or a user of the camera or post-processing software may instruct which kind of horizon to use. In post-processing a photograph to compensate for the distance-related effects of on-camera flash illumination, a camera or post-processing software may simply process the image both ways and allow the user to select the more pleasing result.

While the examples shown thus far use horizontal and vertical planes for ease of explanation and visualization, methods or devices in accordance with example embodiments of the invention may also be used on planes that are not horizontal or vertical in the usual sense.

In another example embodiment, measurement accuracy and processing time may be improved by restricting the range of search for dominant lines in a particular mode. For example, in an "architecture" mode that assumes distances computed using a "vertical horizon" are correct, it may be advantageous to consider only nearly-horizontal lines in a photograph. Or a photographer may choose to restrict the search for dominant lines based on the subject matter of a photograph.

Figure 8:
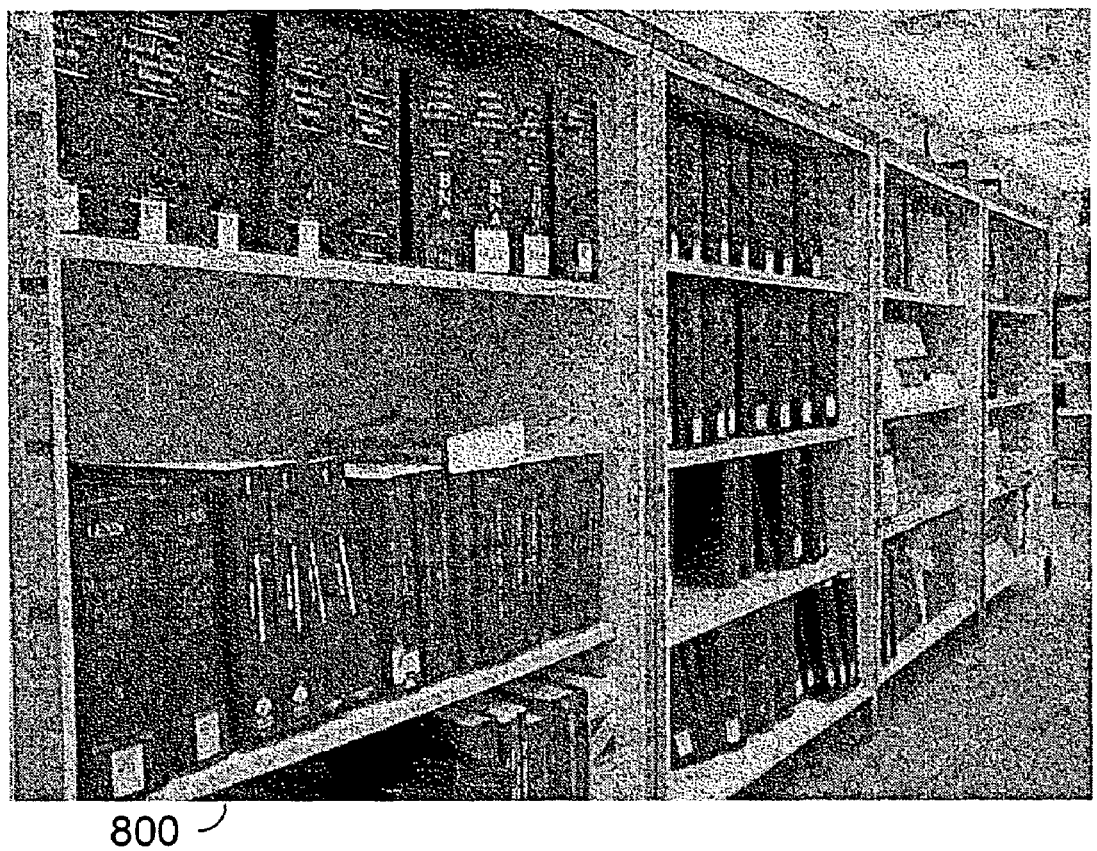
FIG. 8 shows a photograph for which a method in accordance with another 20 example embodiment of the invention would be appropriate.

FIG. 8 shows a photograph 800 for which a restricted search would be useful. It may also be helpful to correct certain lens distortions, for example barrel or pincushion distortion, before performing a method in accordance with an embodiment of the invention. Lens barrel distortion has been at least partially corrected in photograph 800.

Figure 9A:
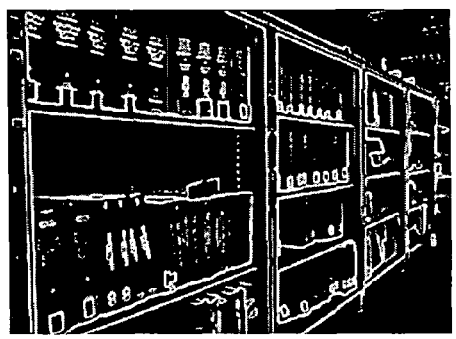
FIGS. 9A-9F show various intermediate results of a method in accordance with an example embodiment of the invention, as applied to the photograph of FIG. 8.
Figure 9B:
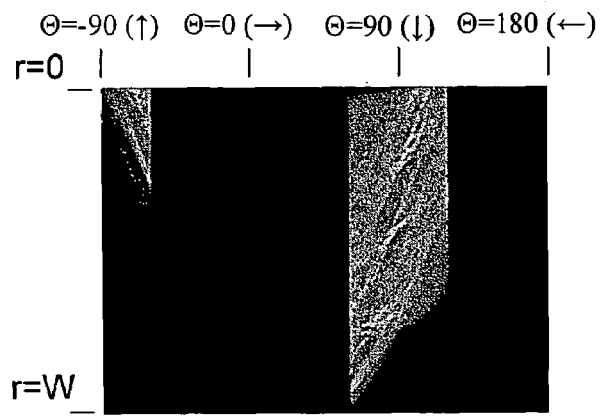
Figure 9C:
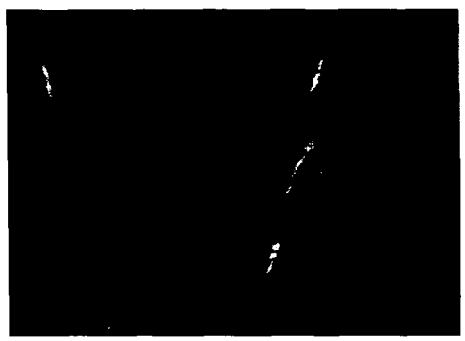
Figure 9D:
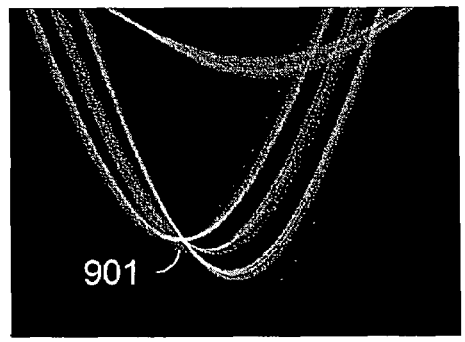
Figure 9E:
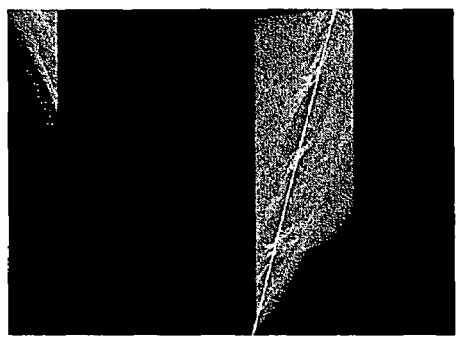
Figure 9F:
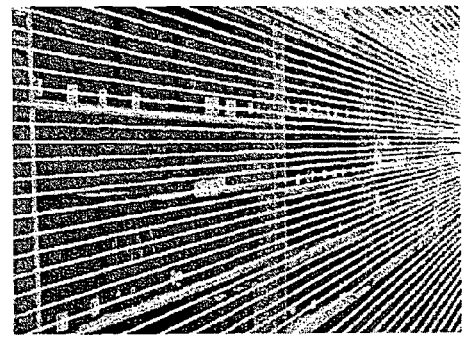

FIG. 9A shows a first edge-detected image that results from applying the Sobel operator to photograph 800. FIG. 9B shows a first Hough accumulator that results from applying the Hough transform to the first edge-detected image of FIG. 9A. The Hough transform has been restricted to search only for lines within 30 degrees of horizontal in photograph 800. As such, only one third of the Hough accumulator is populated. The populated portion corresponds to values for the Hough parameter θ between −90 and −60 degrees, and between 60 and 120 degrees. FIG. 9C shows a second edge-detected image that results from applying the Sobel operator to the first Hough accumulator of FIG. 5B, after removing "edges" found at the transitions from unpopulated to populated areas of the Hough accumulator of FIG. 9B. FIG. 9D shows a second Hough accumulator that results from applying the Hough transform to the edge-detected image of FIG. 9C. Peak 901 characterizes the dominant set of converging near-horizontal lines in photograph 800. FIG. 9E shows the first Hough accumulator of FIG. 9B with a line corresponding to peak 901 superimposed. FIG. 9F shows photograph 800 with converging lines, emanating from a vanishing point found by the example methods previously described, superimposed. Distances to the plane containing the focus point and having a perspective consistent with the converging lines may be found using the methods previously described.

In still another example embodiment of the invention, only relative distance information about a scene is determined. Some uses of distance information do not require that distances from the camera to scene locations be known absolutely, but only require that the distance from the camera to one scene location be known in relation to the distance from the camera to another scene location. For example, in post-processing a digital image to compensate for distance-related unevenness of flash illumination, it may be assumed that the light from an on-camera flash illuminates the scene in accordance with the inverse square law.

That is, the intensity of light falling on an object is in proportion to the square of the distance from the camera to the object. Therefore, a first object that is half the distance from the camera as a second object is assumed to receive four times the light from the on-camera flash as the second object receives. This relationship is assumed to be true regardless of the absolute distances of the objects from the camera. That is, an object that is one meter from the camera receives four times the light as an object that is two meters from the camera, and an object that is five meters from the camera receives four times the light as an object that is 10 meters from the camera.

The methods already described readily give relative distance information. For example, referring to FIG. 6, it was previously determined that the plane of paper 201 at corner 204 is 302 pixels from horizon 602, and that the plane of paper 201 at corner 206 is 702 pixels from horizon 602. It is easily calculated that locations on the plane of paper 201 at the top edge of photograph 200 are 702/302=2.32 times as far from the camera than are locations on the plane of paper 201 at the bottom edge of photograph 200. Similarly, focus point 202 is 502 pixels from horizon 602, and the plane of paper 201 at point 202 is thus 502/302=1.66 times as far from the camera as is a point on the plane of paper 201 at corner 206. In at least some cases, this is sufficient information to post-process photograph 200 to compensate for the diminishing effect of on-camera illumination with distance. If it assumed that the on-camera flash illumination dominates any ambient light present, each particular pixel in photograph 200 may be lightened in squared relation to the distance from the camera of the plane of paper 201 at that pixel. In the example of photograph 200, pixels along the bottom edge of the photograph (those closest to the camera) would be left unaffected. Pixels along the top edge would be lightened by a factor of $2.32^2$ or approximately 5.38. That is, the numerical values of pixels in the digital image are multiplied by 5.38. Pixels that are the same distance from the camera as point 202 would be multiplied by $1.66^2$ or about 2.75. One of skill in the art will recognize that if some ambient light is present, the compensation may be adjusted by subtracting an ambient light reading from each pixel and applying the inverse-square compensation to only the portion of each pixel value that is attributable to flash illumination.

Figure 10:
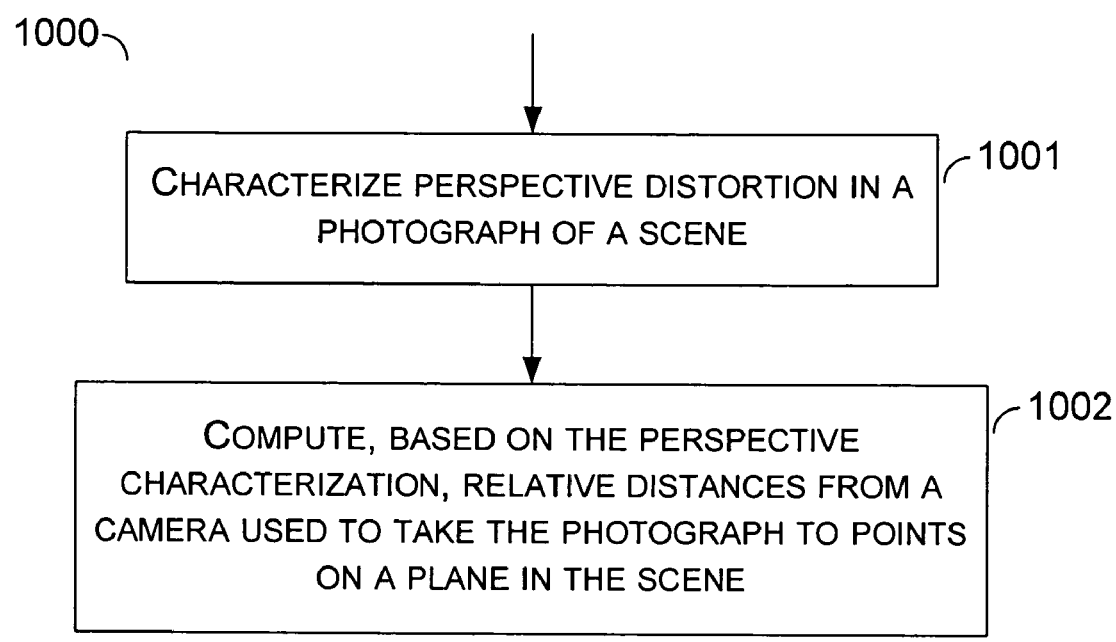
FIG. 10 shows a flow chart of a method in accordance with an example embodiment of the invention.

FIG. 10 shows a flowchart of a method in accordance with this example embodiment of the invention. In step 1001, perspective distortion is characterized in a photograph of a scene. In step 1002, relative distances from the camera used to take the photograph to points on a plane in the scene are computed, based on the perspective characterization.

The invention claimed is:

1. A method, comprising:
   obtaining a measurement of a first distance from a camera to a first point in a scene;
   characterizing perspective distortion in a photograph of the scene;
   computing at least one other axial distance from the camera to at least one other point on a plane in the scene, based on the first distance measurement and the perspective characterization; and wherein:
   characterizing perspective distortion in the photograph further comprises:
   detecting edges in the photograph, producing a first edge-detected image;
   performing a first Hough transform on the first edge-detected image, producing a first Hough accumulator;
   detecting edges in the first Hough accumulator, producing a second edge-detected image;

performing a second Hough transform on the second edge-detected image, producing a second Hough accumulator;
finding a brightness peak in the second Hough accumulator;
performing an inverse Hough transform on the peak, producing a first line in the first Hough accumulator, the first line representing a set of dominant lines in the photograph;
performing an inverse Hough transform on at least two points on the first line, producing at least two corresponding lines similar to the set of dominant lines in the photograph; and
finding an intersection of the corresponding lines.

2. The method of claim 1, wherein the first distance is the distance from the camera to a point in the scene on which the camera is focused.

3. The method of claim 2, wherein the first distance is derived from at least one position of one or more elements of a lens of the camera.

4. The method of claim 1, wherein computing at least one other axial distance further comprises:
locating a horizon for the photograph; and
computing the other axial distance in inverse proportion to the distance from the at least one other point in the photograph to the horizon.

5. The method of claim 4, wherein the horizon is horizontal.

6. The method of claim 4, wherein the horizon is vertical.

7. The method of claim 1, further comprising:
selecting a mode; and
choosing which of a horizontal horizon and a vertical horizon to use in computing distances, the choice based on the mode selection.

8. The method of claim 7, wherein the mode is designed for photographing documents, and wherein the horizontal horizon is used.

9. The method of claim 1, further comprising computing axial distances from the camera to the plane in at least two scene locations corresponding to corners of the photograph.

10. The method of claim 1, wherein the photograph is a preliminary photograph, and further comprising selecting a combination of a lens aperture and a is focus distance such that all points on the plane are in acceptable focus in a final photograph of the scene.

11. The method of claim 10, wherein the focus distance is an axial distance to a scene location upon which the camera focused in obtaining the photograph used to characterize perspective.

12. The method of claim 1, further comprising:
locating a horizontal horizon for the photograph;
locating a vertical horizon for the photograph;
computing a range of axial distances from the camera to a first plane in the scene based on the horizontal horizon; and
computing a range of axial distances from the camera to a second plane in the scene based on the vertical horizon.

13. The method of claim 12, further comprising selecting a combination of a focus distance and a lens aperture such that scene features within all of both ranges are in acceptable focus in a subsequent photograph taken using the combination.

14. The method of claim 13, wherein the focus distance is an axial distance to a scene location upon which the camera focused in obtaining the photograph used to characterize perspective.

15. The method of claim 1, further comprising:
locating a horizontal horizon for the photograph;
locating a vertical horizon for the photograph;
performing the steps of characterizing perspective distortion and computing at least one other axial distance based on both horizons;
presenting both results to a user; and
enabling a user to select one of the results.

16. The method of claim 1, further comprising compensating for distance-related effects of on-camera flash illumination by post-processing a photograph based on the distance measurements.

17. The method of claim 1, performed in a camera.

18. The method of claim 1, wherein the plane is a plane that includes the first point in the scene, and on which parallel lines exhibit the same perspective distortion as is dominant in the photograph.

19. The method of claim 1, further comprising:
recording the first distance measurement with the photograph; and
subsequently performing the steps of characterizing perspective distortion and computing at least one other axial distance.

20. The method of claim 1, further comprising:
correcting at least one form of distortion in the photograph other than perspective distortion; and
subsequently performing the steps of characterizing perspective distortion and computing at least one other axial distance.

21. The method of claim 20, wherein the form of distortion other than perspective distortion is either lens barrel distortion or lens pincushion distortion.

22. A camera, comprising logic, the logic configured to perform the following method:
obtaining a measurement of a first distance from a camera to a first point in a scene;
characterizing perspective distortion in a photograph of the scene; computing at least one other axial distance from the camera to at least one other point on a plane in the scene, based on the first distance measurement and the perspective characterization, and wherein:
characterizing perspective distortion in the photograph further comprises:
detecting edges in the photograph, producing a first edge-detected image;
performing a first Hough transform on the first edge-detected image, producing a first Hough accumulator;
detecting edges in the first Hough accumulator, producing a second edge-detected image;
performing a second Hough transform on the second edge-detected image, producing a second Hough accumulator;
finding a brightness peak in the second Hough accumulator;
performing an inverse Hough transform on the peak, producing a first line in the first Hough accumulator, the first line representing a set of dominant lines in the photograph;
performing an inverse Hough transform on at least two points on the first line, producing at least two corresponding lines similar to the set of dominant lines in the photograph; and
finding an intersection of the corresponding lines.

23. The camera of claim 22, further comprising a lens, and wherein the first distance is the distance from the camera to the point in the scene on which the lens is focused.

24. The camera of claim 23, wherein the first distance is derived from at least one position of at least one lens element.

25. The camera of claim 22, wherein computing at least one other axial distance further comprises:
   locating a horizon for the photograph; and
   computing the axial distance as in inverse proportion to the distance from the location of the point in the photograph to the horizon.

26. A system, comprising:
   a camera;
   a computer; and wherein:
   the camera is configured to take a photograph of a scene;
   the camera is configured to measure a first distance from the camera to a first point in the scene;
   the photograph and the first distance measurement are transferred to the computer;
   the computer is configured to characterize perspective distortion in the photograph;
   the computer computes at least one other axial distance to at least one other point on a plane in the scene using the first distance measurement and the perspective characterization; and
   wherein characterizing perspective distortion in the photograph further comprises:
      detecting edges in the photograph, producing a first edge-detected image;
      performing a first Hough transform on the first edge-detected image, producing a first Hough accumulator;
      detecting edges in the first Hough accumulator, producing a second edge-detected image;
      performing a second Hough transform on the second edge-detected image, producing a second Hough accumulator;
      finding a brightness peak in the second Hough accumulator;
      performing an inverse Hough transform on the peak, producing a first line in the first Hough accumulator, the first line representing a set of dominant lines in the photograph;
      performing an inverse Hough transform on at least two points on the first line, producing at least two corresponding lines similar to the set of dominant lines in the photograph; and
      finding an intersection of the corresponding lines.

27. A camera, comprising:
   means for obtaining a first measurement of a first distance from the camera to a first point in a scene;
   means for characterizing perspective distortion in a photograph of the scene; and
   means for computing at least one other axial distance to at least one other point on a plane in the scene using the first distance measurement and the characterization of perspective distortion, and wherein the means for characterizing perspective distortion in the photograph of the scene comprises:
      means for detecting edges in the photograph, producing a first edge-detected image;
      means for performing a first Hough transform on the first edge-detected image, producing a first Hough accumulator;
      means for detecting edges in the first Hough accumulator, producing a second edge-detected image;
      means for performing a second Hough transform on the second edge-detected image, producing a second Hough accumulator;
      means for finding a brightness peak in the second Hough accumulator;
      means for performing an inverse Hough transform on the peak, producing a first line in the first Hough accumulator, the first line representing a set of dominant lines in the photograph;
      means for performing an inverse Hough transform on at least two points on the first line, producing at least two corresponding lines similar to the set of dominant lines in the photograph; and
      means for finding an intersection of the corresponding lines.

* * * * *

UNITED STATES PATENT AND TRADEMARK OFFICE
CERTIFICATE OF CORRECTION

PATENT NO. : 7,372,550 B2 Page 1 of 1
APPLICATION NO. : 11/244950
DATED : May 13, 2008
INVENTOR(S) : Andrew C. Goris et al.

It is certified that error appears in the above-identified patent and that said Letters Patent is hereby corrected as shown below:

In column 1, line 63, after "another" delete "20".

In column 5, line 22, delete "0example" and insert -- example --, therefor.

In column 5, line 57, delete "Comer" and insert -- Corner --, therefor.

In column 6, line 37, delete "Comer" and insert -- Corner --, therefor.

In column 9, line 43, in Claim 10, after "and a" delete "is".

Signed and Sealed this

Fifth Day of May, 2009

JOHN DOLL
*Acting Director of the United States Patent and Trademark Office*